United States Patent [19]
Benda et al.

[11] Patent Number: 5,353,472
[45] Date of Patent: Oct. 11, 1994

[54] GROMMET/PLUG

[76] Inventors: Steven J. Benda, P.O. Box 782, Cokato, Minn. 55321; James H. Benda, 36480 Howard Rd., Farmington, Mich. 48331; Gary Thompson, 23 Skyview Ridge, St. Peter, Minn. 55082

[21] Appl. No.: 997,022

[22] Filed: Dec. 28, 1992

[51] Int. Cl.⁵ .......................... B65D 55/00; F16L 5/00
[52] U.S. Cl. ........................................... 16/2; 220/307; 220/DIG. 19; 217/106; 217/110
[58] Field of Search ................ 16/2, 108; 174/152 G, 174/153 G, 167, 65 G; 24/713.6; 220/307, DIG. 19; 411/508, 509, 913; 215/364; 217/98, 106, 109, 110

[56] References Cited
U.S. PATENT DOCUMENTS

| | | | |
|---|---|---|---|
| 3,793,672 | 2/1974 | Wetmore | 16/2 |
| 4,041,241 | 8/1977 | Olmstead et al. | 174/153 G |
| 4,081,879 | 4/1978 | Rubright | 16/2 |
| 4,572,390 | 2/1986 | Grittmann | 220/307 |
| 4,656,689 | 4/1987 | Dennis | 16/2 |
| 4,784,285 | 11/1988 | Patel | 220/307 |

FOREIGN PATENT DOCUMENTS 4108677 9/1992 Fed. Rep. of Germany ... 174/65 G

Primary Examiner—Lowell A. Larson
Assistant Examiner—Donald M. Gurley
Attorney, Agent, or Firm—Paul H. Gallagher

[57] ABSTRACT

A main member of soft plastic material and a second member of hard plastic material, chemically compatible and thermally bonded together. The second member is partially slitted having a ring element embedded in the main member, and segments distributed circumferentially around the ring. The segments can be swung radially to facilitate insertion into a hole, and they spring outwardly to grip the panel in which the grommet is mounted. In one form the second member is entirely slitted, and thereby made up of separate segments or fingers.

13 Claims, 3 Drawing Sheets

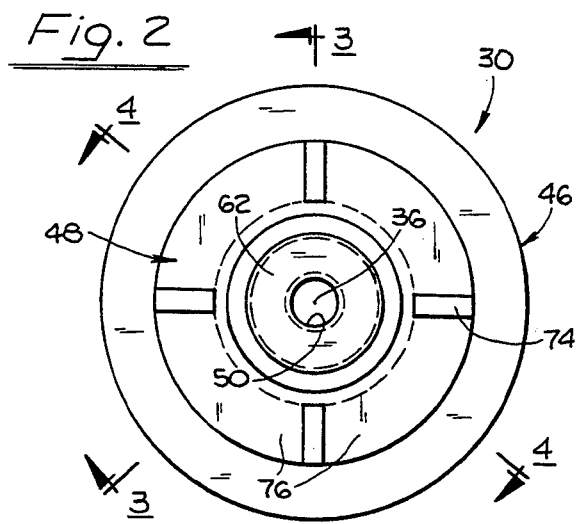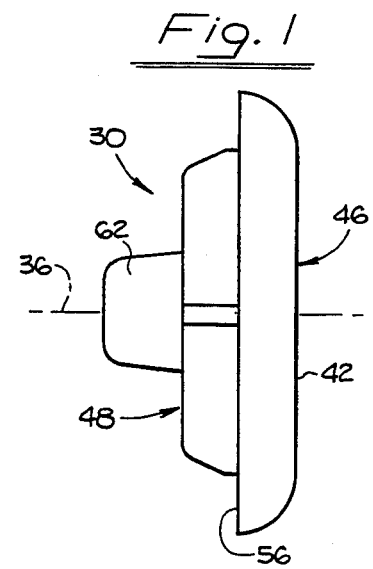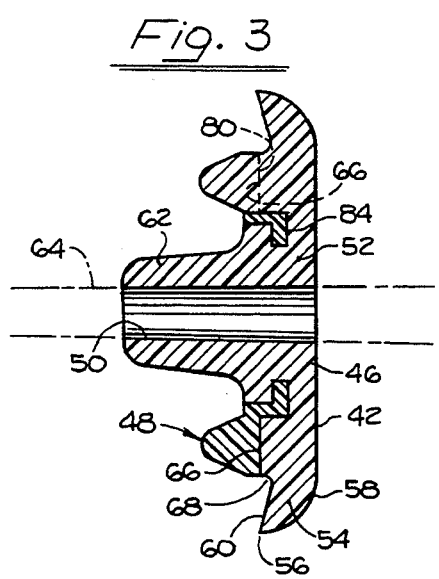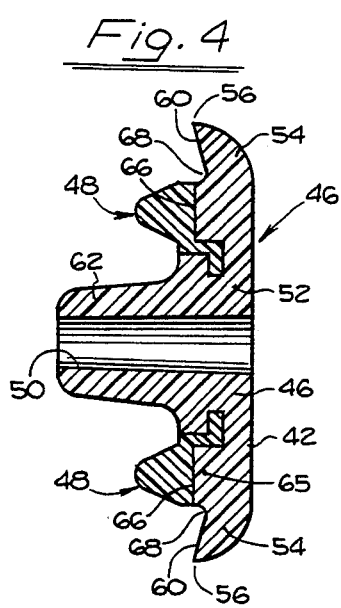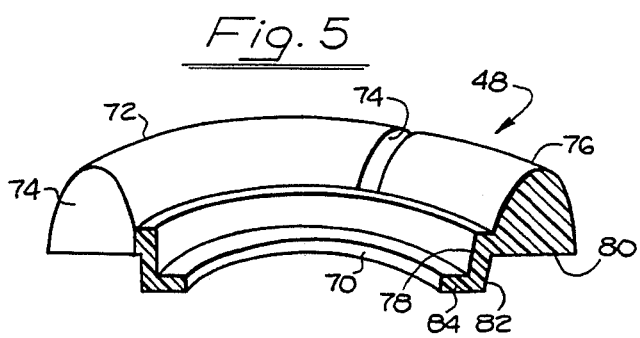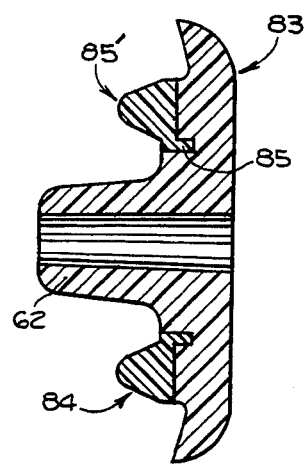

GROMMET/PLUG

BRIEF SUMMARY OF THE INVENTION

The invention resides in the field of grommets used for filling or closing holes in a panel. As a matter of background, in the construction and installation of various items, there are included panels, such as metal sheets, and in the construction or installation, holes are provided in the panels which are to be filled or closed later. In one case for example a hole may be used for insertion of an electric cable or a control cable that could not be installed otherwise, and it is desired to close the hole with the cable extending therethrough. In another case for example, such a hole may be provided to enable access to a workman for performing a work manipulation through the hole, and then later the hole is to be closed or plugged. It is desired that the grommets be securely mounted in place to completely fill the hole, and to prevent accidental displacement therefrom, and for so providing such secure mounting, heretofore the grommets were provided with a construction for engaging both of opposite surfaces of the panel.

Grommets made for this purpose heretofore, have been made in two members secured together, which when the grommet is inserted in the hole in the panel, engage the opposite surfaces of the panel, around the hole, holding the grommet in place. The hole must also be sealed, and the two members making up the grommet are designed for sealing the hole against the passage of air and moisture. Grommets of this general nature have been known before, but they have had serious drawbacks or disadvantages.

Such grommets have been made of plastic materials of predetermined different characteristics, for performing sealing functions, and locking functions, respectively. For this purpose the respective plastics were of soft material and rigid material respectively, firmly secured together in a dual durometer process to produce the desired unitary grommet, and when the grommet is inserted in the hole, the respective parts are positioned for sealing and locking respectively.

This general kind of grommet is disclosed for example in Patel U.S. Pat. Nos. 4,784,285 and 4,885,121. The disclosures of those two patents appear identical. The present invention constitutes a major step in advance beyond the concept of those patents. In those patents, the two members making up the grommet are continuous around their periphery, both round and of other shapes. In placing such a grommet in position of use, the usual manipulation is to insert the member of rigid material through the penetration hole, this member performing a locking effect. For this purpose this member is slightly larger than the hole, and it is forced through the hole where it then engages the opposite surface of the panel and thus locks the grommet in the hole. In this position of the grommet, the member of soft material is positioned on the panel opposite the rigid material member, and performs a sealing effect.

In forcing the rigid material member through the hole, which as mentioned above is larger than the hole, it must be distorted in order to accomplish that step. This is a difficult step, and results in possible inaccurate alignment.

The device of the present invention incorporates a completely new and basic feature for overcoming that distortion of the rigid material member. Basically the rigid material member is made up of sections or segments arranged in that circumferential shape, with the desired elimination of the distortion of that member, as referred to.

Accordingly, a main object of the present invention is to provide a grommet of the general nature referred to above, wherein the member of rigid material is made in segments or sections, enabling those segments to individually flex or move, each without material restraint from the others, enabling the member as a whole to be flexed for forcing it through the hole in the panel, without objectionably distorting the member.

More specifically, the invention includes the feature that the grommet can be inserted into the hole in straight axial direction, without the necessity of cocking or prying the grommet into place. It is thus easier to insert, and there is greater assurance of it being accurately positioned.

Another and more specific object is to provide the feature of the character Just referred to, that has a further advantage that while the segments of the rigid material member yield out of a normal position, they snap back fully into their normal and locking position, for holding the grommet in place.

Another advantage is that the rigid material member, because of its segmented nature, will more effectively fill a hole that may have slight irregularities.

Still another object is to provide a grommet of the foregoing character, made up of plastic materials of different characteristics, that are chemically compatible, and thermally bondable together, having a further feature and advantage that the two members are also mechanically well bound together to prevent possible separation or misalignment therebetween.

Another and more specific object is to provide a grommet of the foregoing character, wherein the mechanical binding effect is accomplished by portions of the rigid material member being completely embedded in the soft material member.

Still another and very important feature of the invention is that the grommet can be predetermined in design and dimensions, according to its intended use so that it is "tunable", that is, it can be designed for producing substantially uniform effect in situations of diverse kinds.

Another great advantage of the invention is that the device can be made of either of different kinds, namely, a) wherein the segments of the rigid material member, although separated from each other as segments, are all secured to a common circumferential continuous structural collar, and b) wherein the segments are completely separated from each other, and not secured to a common interconnecting element, but are individually held in the soft material member, and so held by being molded therein.

BRIEF DESCRIPTION OF THE INDIVIDUAL FIGURES OF THE DRAWINGS

FIG. 1 is a side view of the grommet of the present invention.

FIG. 2 is a view of the inner surface of the grommet, as viewed from the left of FIG. 1.

FIG. 3 is a sectional view taken at line 3—3 of FIG. 2.

FIG. 4 is a sectional view taken at line 4—4 of FIG. 2.

FIG. 5 is a perspective view of a portion of the hard material part of the grommet.

FIG. 6 is a view oriented corresponding to FIG. 4 showing a modified form of grommet.

DETAILED DESCRIPTION

Figure 7:
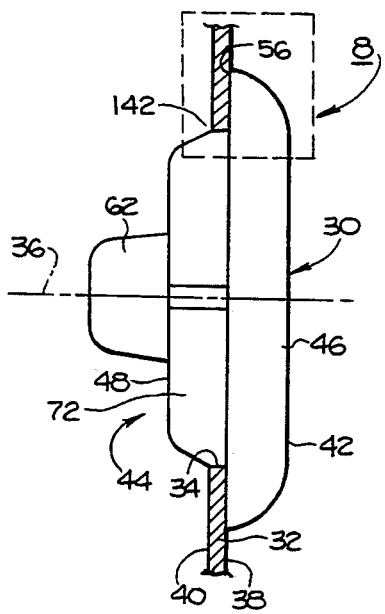
FIG. 7 is a view oriented according to FIG. 1 showing the grommet mounted in closing position in a hole in a panel.

Referring to the drawings in detail, attention is directed first to FIGS. 1, 2, and 7. FIGS. 1 and 2 show the grommet of the invention in isolated position and FIG. 7 shows it mounted in a penetration hole in a panel. For convenience, the panel is shown in vertical position in accordance with its position of use in many occasions, and all other elements are referred to as oriented according to that position of the panel.

Although the device may be in the form of either a grommet or a plug, within the scope of the invention, it may properly be designated a grommet/plug, but for convenience, it will be referred to herein as a grommet, and it is intended that that be a generic name of the item.

The grommet is indicated at 30 and the panel in which it is mounted, at 32. The panel is provided with a penetration hole 34 which is slightly smaller than the effective diameter of the grommet as will be referred to in detail hereinbelow. An axis is shown at 36, which is perpendicular to the panel, and constitutes the central axis of the hole, and it becomes the central axis of the grommet as described herein.

Additionally, the panel, for convenience, is referred to as having an outer surface 38 and an inner surface 40. As coordinated therewith, the grommet, as oriented in the hole in the panel, has an outer surface 42 and an inner surface indicated generally at 44, although in molding practices, the molded article may be referred to differently.

As a matter of general background, such a panel (32) is utilized in various constructions, and is provided with various holes (34) to accommodate the passage of electric cables, or control cables, therethrough, for example. A grommet is then utilized for sealing the hole and the cable. In this kind of situation, the hole may be referred to as a penetration, i.e., for the penetration of a cable. Another occasion in which grommets are used, is where holes are provided for enabling a workman to reach therethrough to perform an operation in the space covered by the panel. After that operation is performed, the grommet is utilized for closing the hole, i.e., entirely plugging it, as distinguished from accommodating a cable. In either case the grommet effects a complete seal with the panel. In the present instance, the invention is adapted to accommodating a cable, although the grommet can be constructed and utilized for simply completely plugging the hole.

The grommet 30 (FIGS. 3-6) is made up of a main soft member 46 and a second, rigid member 48. These members may also be referred to as a sealing member and a locking member, respectively. Each of the members is integral, and constituted by a one-piece molded article. The grommet preferably is made of plastic materials, the materials of the two members being different, but chemically compatible, and thermally bondable. Examples of the materials used are:

EXAMPLE I

Rigid material: Krayton (Shell Corp.) in the range of Shore D hardness.

Soft material: Krayton (Shell Corp.) in the range of Shore A hardness.

EXAMPLE II

Rigid material: Hytrel (DuPont Corp.) in the range of Shore D hardness.

Soft material: Alcryn (DuPont Corp.) in the range of Shore A hardness.

It will be understood that there are other plastic materials that can be used instead.

The two individual members 46, 48, are formed, and the entire grommet formed, in a dual durometer method heretofore known. The first material, in this case the rigid material, is first molded, and is molded at a relatively lower temperature. After first molding, it is left to cool, at least somewhat, and then the other material, which is of a higher moldable temperature, is molded in the mold with the first material, and the higher effective temperature tends to soften the plastic of the first member, sufficiently to form a molding and bonding effect therebetween. Examples of molding temperatures involved are 390° F. for the rigid materials, and 435° F. for the second materials. Obviously other temperatures may be used instead. After the second member is thus molded, the entire unit is allowed to cool, and the resulting molded article is the complete grommet. The two members are secured together for all purposes, both in handling, and inserting the grommet into the hole, and in locking the grommet in place therein. The members 46, 48, after these molding steps, and in the complete grommet, form an effective and integral one-piece grommet. In the following description, the mechanical formation and construction is covered, as well as the manner of utilizing the grommet.

In the main member 46, the outer surface 42 referred to, is annular in shape (FIGS. 2-4), concentric with a central cable hole 50. The main member includes a central part 52 constituting in effect a core or body of the member, which has a peripheral portion 54 terminating in a radially outer relatively sharp edge 56. The peripheral portion 54 has an outer rounded surface 58 forming an extension of the surface 42, and an inner surface 60 of conical shape, straight in radial direction, the edge 56 thus being positioned inwardly from the outer surface 42. This edge 56 engages the panel in a sealing effect as referred to again hereinbelow.

The main soft member 46 is provided with a tubular cable mount or nipple 62 in which the hole 50 is formed, and which may extend inwardly (to the left, FIGS. 1, 3) a substantial extent, to securely hold the cable 64 passing therethrough, allowing movement of the cable while still sealing it. This accommodation of the cable need not be dwelt upon in detail, it being pointed out that the soft material of the main member yields to the cable passing therethrough and effectively seals the cable.

The main soft member 46 also has an annular structural element 65 extending axially and having an annular surface 66 directed or facing inwardly, in axial direction, and referred to as a bonding surface. This surface is positioned slightly inwardly from the radially inner end of the surface 60, as indicated at 68, which comes into play in mounting the grommet in the hole in the panel as referred to hereinbelow.

The second member 48, of rigid material, shown isolated in FIG. 5 and also shown in FIGS. 2-4, includes a continuous ring piece 70, and gripping or holding means 72 segmented by radial slits 74 forming segments 76, in this case four in number, integrally connected to the ring at 78. The segments 76 are quite massive, having large dimensions in axial and radial directions. Their axially inner surfaces are preferably rounded, while their outer surfaces as indicated at 80, are annular in shape, extending radially outwardly beyond the junction 78. The surfaces 80 lie in a common plane, and in the final article, are bonded to the surface 66 (FIG. 3) of the soft member. The bonded surfaces 80, 66 thus produce a securing effect and they provide a mechanical securement of limited extent, but a greater mechanical securement is produced by the shaped elements described below.

The ring piece 70 in cross section is L shape, having an axial leg 82 in the form of a cylinder, and a radial leg 84 lying in a plane perpendicular to the axis 36 and having a radial extension of annular shape. In this form, the ring piece 70 is nearly entirely embedded in the material of the main soft member 46, providing great mechanical strength because of the great mutual contact area between the soft and rigid members and because of the L shape of the ring piece.

FIG. 6 shows a modified form of grommet, indicated at 83 which is similar to the grommet 30 of FIG. 1, but the second member herein, 85', differs from the second member 48 in that it has a ring piece 85 which is made up only of a cylindrical element extending axially and without the transverse leg 84 of FIG. 5. The ring piece 85 is entirely embedded in the soft material of the main member and provides a holding and strengthening effect similar to that of the ring piece 70, but of lesser extent, and may be used where less strength is required.

In the case of this form (FIGS. 1-5), it is not essential that the plastic materials be thermally bonded, because the L shape structural collar 70 provides sufficient strength to secure the members together mechanically.

Figure 8:
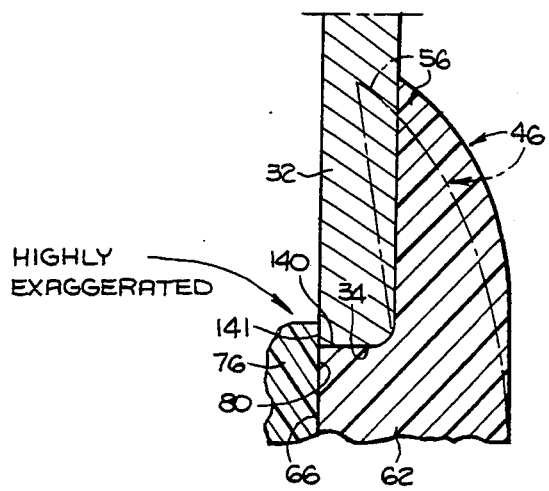
FIG. 8 is a large scale, sectional view of the portion of FIG. 7 enclosed in the rectangle 8.
Figure 9:
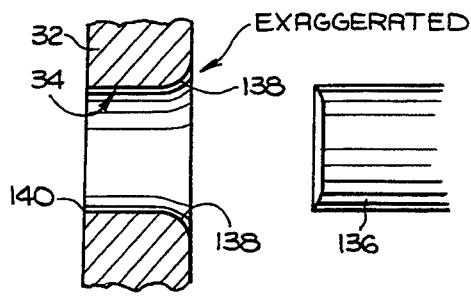
FIG. 9 is a sectional view of a fragment of a panel representing a step in punching a hole therein.
Figure 10:
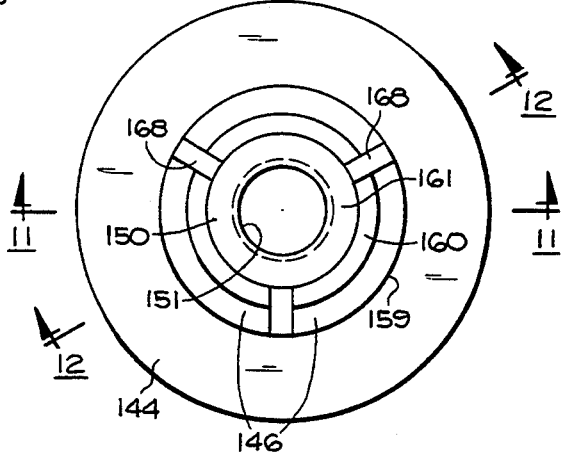
FIG. 10 is a view oriented according to FIG. 2 showing a different form of grommet.
Figure 11:
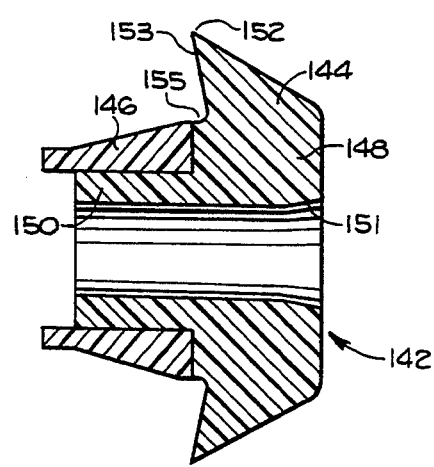
FIG. 11 is a sectional view taken at line 11—11 of FIG. 10.
Figure 12:
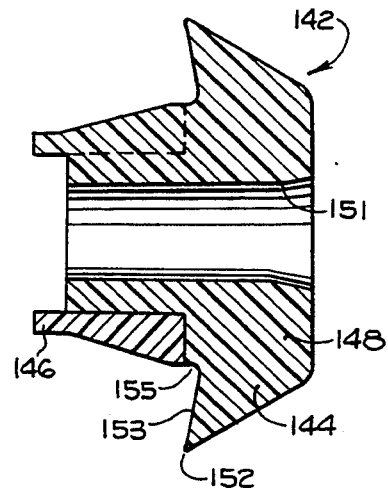
FIG. 12 is a sectional view taken at line 12—12 of FIG. 10.
Figure 14:
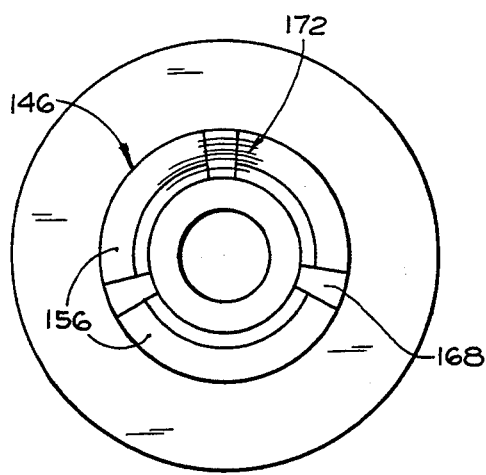
FIG. 14 is a top view of a grommet slightly modified from that of FIG. 10.
Figure 13:
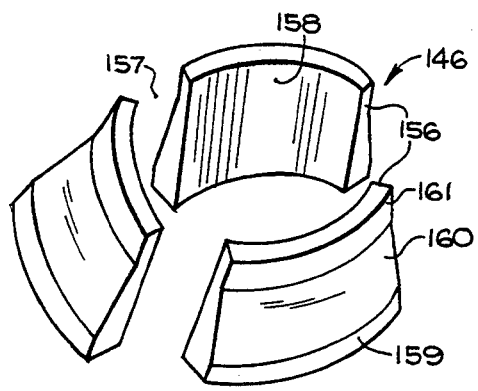
FIG. 13 is a perspective view of the set of parts or fingers constituting the hard material member of the grommet of FIGS. 10-12.

FIGS. 7, 8 and 9 illustrate portions of the panel and grommet and the details of their interaction. The significant point of contact, or relationship, is indicated at 142 where the radially outer edge of the rigid segment 76 is positioned at the inner edge of the penetration hole 34. In normal fabricating operations, the hole 34 in the panel is punched by a punch 136, and in this operation, a very slight curve or radius 138 is formed, of very small dimensions, but this facilitates entrance of the grommet into the hole. At the outlet end, or inner end of the hole, is a relatively sharp corner 140 where the trailing or outer edge of the second member of rigid material springs out radially therebeyond, forming a more secure positioning of the grommet in the hole. The soft material at the outer end of the segment of the grommet, indicated at the position 141 in FIG. 8, is shown exaggerated, the soft and hard material being bonded together throughout the full radial extent of the hard material, although it yields radially inwardly.

FIG. 8 shows particularly the sharp sealing edge 56, which engages the outer surface of the panel and forms a sealing effect and in this case the only sealing effect relied on. It will be understood of course that sealing effects take place at other positions, but that by the edge 56 is the significant and principal position. The dot-dash line in FIG. 8 shows the normal position of the edge which is illustrated in FIGS. 2-4, and it is so positioned and shaped that when the grommet is fully inserted in the hole, the edge 56 is pushed outwardly to the position shown in the full lines, producing a biasing effect of the soft material against the panel, to the left as viewed in FIG. 8, thus providing the desired sealing effect.

In the grommet of the invention the movement as between the different segments of the locking members and their interaction are uniform and substantially equal, resulting in the grommet being more accurately positioned as to the locking and sealing functions.

FIGS. 10-14 show another form of grommet, using entirely thermal bonding. The grommet is indicated at 142 and is generally similar to the grommets described above in that it includes a main member 144 of soft material and a second member or means 146 of rigid material. In the present case the rigid material means 146 is not in the form of a ring, but in a plurality of separate elements circumferentially spaced apart, three such elements being used, but the specific number being used is not important.

The main member 144 has a central part 148 that includes a cable mount 150 through which is a cable hole 151 for receiving the cable, in a manner described above. The main member 144 has a peripheral sharp sealing edge 152 radially inwardly of which is a conical surface 153 leading to a generally cylindrical surface 155.

In the second member 146, the parts or fingers 156 are identical. Each part has a cylindrical inner surface 158 and an outer surface with a lead-in angle, which for convenience may include three bands, an outer or lower band 159 of cylindrical shape, a middle band 160 of conical shape, and an inner or upper band 161 of cylindrical shape. The rigid member, made up of the fingers 156, and the main soft member 144 are bonded together in the same manner as described above.

In forming this grommet (FIGS. 10-12) the parts 156 are molded in a first step in which the parts are spaced apart, leaving spaces or gaps 168 therebetween (FIG. 13), and in molding the main soft member thereto the gaps remain. However, if desired, the mold may be modified after that step, removing the mold elements that formed the gaps, and enabling the soft material to fill the gaps, leaving a continuous outer surface as between the fingers 156 and the soft material, as shown at 172 in FIG. 14.

The resulting grommet 142 of this form of the invention, is utilized in the panel in the same manner as described above. It is inserted in a similar manner, by forcing it in inward direction through the penetration hole, in straight axial direction, and in this step, the fingers 156 yield radially inwardly a slight amount, and the outer or lower edges of the fingers engage the inner surface of the panel, to a very slight amount, around the periphery of the hole in the panel.

These fingers, being separate from each other, yield radially inwardly, in response to their engagement with the marginal hole in the panel in the insertion of the grommet into the hole.

The grommet is "tunable", that is, the members thereof, and particularly the segments of the second, locking member, can be pre-selected as to size and shape, for providing the desired flexibility and strength to accommodate in different installations.

We claim:

1. A grommet for placement in a penetration hole in a panel having an outer surface and an inner surface, and a panel axis perpendicular to the panel, said grommet comprising, a first, sealing member of plastic material and a second, locking member of rigid plastic material, these members being soft and hard respectively relative to each other and constituting the entire grommet, said members being secured together concentrically about a central axis, and said first member having an axially outer surface and an axially inner surface, said central axis being parallel to the panel axis when the grommet is mounted in the penetration hole.

said first member constituting the main portion of the grommet and having a main body circumferentially continuous and defining said axially outer surface and having a peripheral sealing edge directed, to an extent, axially inwardly, said second member being positioned on the axially inner surface of the first member radially inwardly from said sealing edge and being secured thereto on an annular surface of said first member lying in a plane transverse to the central axis, and also on a cylindrical surface of said first member concentric to the central axis, said second member being slitted at least partially therethrough in radial directions from its axially inner edge toward its axially outer edge, t a plurality of locations in circumferential direction, thereby forming a corresponding plurality of circumferentially spaced segments, the segments being spaced apart at their axially inner ends, said segments being flexible radially for facilitating yielding thereof in response to the grommet being inserted into the penetration hole in axial direction, the peripheral edges of the first member and the second member respectively engaging the outer and inner surfaces of the panel for performing sealing and locking functions respectively.

2. A grommet according to claim 1 wherein,
said second member includes a circumferential continuous element embedded in said first member.

3. A grommet according to claim 2 wherein,
said segments are exposed to the exterior, and said circumferential continuous element includes an annular portion lying in a plane perpendicular to the axis and extending radially inwardly from said segments.

4. A grommet according to claim 1 wherein,
said second member is slitted entirely therethrough thereby forming a plurality of fingers independent of and disconnected from each other.

5. A grommet according to claim 4 wherein,
said fingers are secured to the first member entirely by being bonded thereto on said annular and cylindrical surfaces.

6. A grommet according to claim 5 wherein,
said second member is disposed entirely in an annular space.

7. A grommet according to claim 5 wherein,
one first member having a central cylindrical cable mount having said cylindrical surface thereon, and that cylindrical surface joining said annular surface, said cable mount being of substantial axial length, and said fingers extending throughout the axial length of the cable mount and in securement thereto through that length.

8. A grommet according to claim 7 wherein,
said fingers are longer than the cable mount in axial direction.

9. A grommet according to claim 5 wherein,
the second member is completely slitted and thereby constituted by a plurality of fingers independent of each other and of the first member and the fingers are bonded to the main member.

10. A grommet according to claim 9 wherein,
the fingers have radially outer surfaces exposed to the exterior throughout their axial length, and the fingers decrease in radial dimension progressing in axial direction from their axial outer ends to their inner ends.

11. A grommet according to claim 9 wherein,
said fingers are spaced apart circumferentially without any material of the first member disposed therebetween.

12. A grommet according to claim 9 wherein,
said fingers are spaced apart circumferentially, and material of the first member fills the spaces therebetween, forming a continuous circular surface of the fingers and the cable mount.

13. A grommet according to claim 5 wherein,
the material making up the main member is substantially in the range of Shore A hardness, and the material making up the second member is substantially in the range of Shore D hardness.

* * * * *